US011961438B2

(12) United States Patent
Lu

(10) Patent No.: US 11,961,438 B2
(45) Date of Patent: Apr. 16, 2024

(54) MONITOR CALIBRATION DEVICE AND METHOD, AND MONITOR CONTROL CIRCUIT AND METHOD

(71) Applicant: REALTEK SEMICONDUCTOR CORPORATION, Hsinchu (TW)

(72) Inventor: Yi-Chin Lu, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 17/683,400

(22) Filed: Mar. 1, 2022

(65) Prior Publication Data

US 2022/0375379 A1 Nov. 24, 2022

(30) Foreign Application Priority Data

May 21, 2021 (TW) ................................ 110118510

(51) Int. Cl.
*G09G 3/20* (2006.01)

(52) U.S. Cl.
CPC ....... *G09G 3/20* (2013.01); *G09G 2320/0626* (2013.01); *G09G 2320/0693* (2013.01); *G09G 2360/16* (2013.01)

(58) Field of Classification Search
CPC ............ G09G 3/20; G09G 2320/0626; G09G 2320/0693; G09G 2320/0673; G09G 2360/16
See application file for complete search history.

(56) References Cited

U.S. PATENT DOCUMENTS

| | | | | |
|---|---|---|---|---|
| 8,907,935 B2 * | 12/2014 | Syed | G09G 3/3406 345/207 |
| 10,283,057 B2 * | 5/2019 | Reddy | G09G 3/3406 |
| 2003/0025711 A1 * | 2/2003 | Kuo | G09G 5/02 348/E17.005 |
| 2012/0019152 A1 * | 1/2012 | Barnhoefer | H05B 45/12 315/158 |

FOREIGN PATENT DOCUMENTS

CN 104183229 B 8/2016

OTHER PUBLICATIONS

OA letter of the counterpart TW application (appl. no. 110118510) dated Feb. 22, 2022. Summary of the OA letter: 1) Claim(s) 6, 7 and 10 is/are rejected under Patent Law Article 22(1) as being anticipated by reference 1 (CN104183229B). (2) Claim(s) 8-9 is/are rejected under Patent Law Article 26(2) as being indefinite.) Claim correspondence between the TW counterpart application and the instant US application: Claims 1-4 and 6-10 in the TW counterpart application correspond to claims 1-9 in the instant US application, respectively.

* cited by examiner

*Primary Examiner* — Antonio A Caschera
(74) *Attorney, Agent, or Firm* — WPAT, P.C.

(57) ABSTRACT

A monitor control method is used for controlling a monitor and includes the following steps: controlling the monitor to display a pattern; selecting, in response to a selection signal, one of a plurality of brightness curves as a target brightness curve, or generating by interpolation the target brightness curve; and controlling the brightness of the monitor according to the target brightness curve.

4 Claims, 4 Drawing Sheets

MONITOR CALIBRATION DEVICE AND METHOD, AND MONITOR CONTROL CIRCUIT AND METHOD

BACKGROUND OF THE INVENTION

1. Field of the Invention

The present invention generally relates to monitors, and, more particularly, to monitor calibration devices and methods, and monitor control circuits and methods.

2. Description of Related Art

With the advancement of science and technology, the conventional medical image observation through films and light boxes are becoming less popular; instead, nowadays most physicians or professionals use monitors (or displays) to observe medical images, from which information is obtained for the determination of symptoms on the patient. Most of these medical images, including X-ray images, ultrasound images, tomographic images, etc., are presented in grayscale, and the slight difference in pixel values in these images may be an indication of a specific symptom. Because these differences are very subtle, the monitor must be calibrated according to a specific brightness curve to make the observation easier. If the brightness of the monitor is not correctly calibrated, the user may misjudge or overlook the symptoms.

In the conventional calibration method, a built-in or external illuminometer is required to measure the luminance of the monitor. However, since the ambient light intensity of the monitor is usually not uniform, the measurement of the luminance on multiple spots of the monitor must be conducted to avoid errors. This step is not only time-consuming but also increases the hardware cost of the calibration.

In addition, the conventional calibration method needs to know the accurate reflectance of the monitor in advance. This step, however, is complicated and time-consuming as the reflectance of the monitor is not easy to measure.

SUMMARY OF THE INVENTION

In view of the issues of the prior art, an object of the present invention is to provide a monitor calibration device and method and a monitor control circuit and method, so as to make an improvement to the prior art.

According to one aspect of the present invention, a monitor calibration device is provided. The monitor calibration device includes a luminance measurement device, a memory, and a calculation circuit. The luminance measurement device is configured to measure a first luminance and a second luminance of a monitor. The memory is configured to store a plurality of program codes or program instructions. The calculation circuit is coupled to the luminance measurement device and the memory and configured to execute the program codes or program instructions to perform the following steps: (A) determining a range of a product of a reflectance of the monitor and an ambient light intensity; (B) determining a first product and a second product from the range of the product according to the range of the product, the first luminance, and the second luminance; (C) generating a first brightness curve according to the first luminance, the second luminance, and the first product; (D) generating a second brightness curve according to the first luminance, the second luminance, and the second product; (E) generating a third brightness curve corresponding to a third product according to the first brightness curve, the second brightness curve, the first product, and the second product, the third product being between the first product and the second product; and (F) determining whether the third brightness curve meets a target condition.

According to another aspect of the present invention, a monitor calibration method is provided. The method includes the following steps: (A) a luminance measurement device measures a first and second luminance of a monitor; (B) determining a range of a product of a reflectance of the monitor and an ambient light intensity; (C) determining a first product and a second product from the range of the product according to the range of the product, the first luminance, and the second luminance; (D) generating a first brightness curve according to the first luminance, the second luminance, and the first product; (E) generating a second brightness curve according to the first luminance, the second luminance, and the second product; (F) generating a third brightness curve corresponding to a third product according to the first brightness curve, the second brightness curve, the first product, and the second product, the third product being between the first product and the second product; and (G) determining whether the third brightness curve meets a target condition.

According to still another aspect of the present invention, a monitor control circuit for controlling a monitor is provided. The monitor control circuit includes a memory and a calculation circuit. The memory is configured to store a plurality of brightness curves and a plurality of program codes or program instructions. The calculation circuit is coupled to the memory and configured to execute the program codes or program instructions to perform following steps: controlling the monitor to display a pattern; selecting, in response to a selection signal, one of the brightness curves as a target brightness curve, or generating by interpolation the target brightness curve; and controlling brightness of the monitor according to the target brightness curve.

According to still another aspect of the present invention, a method of controlling a monitor is provided. The method includes the following steps: controlling the monitor to display a pattern; selecting, in response to a selection signal, one of a plurality of brightness curves as a target brightness curve, or generating by interpolation the target brightness curve; and controlling brightness of the monitor according to the target brightness curve.

These and other objectives of the present invention no doubt become obvious to those of ordinary skill in the art after reading the following detailed description of the preferred embodiments with reference to the various figures and drawings.

DETAILED DESCRIPTION OF THE EMBODIMENTS

Figure 1:
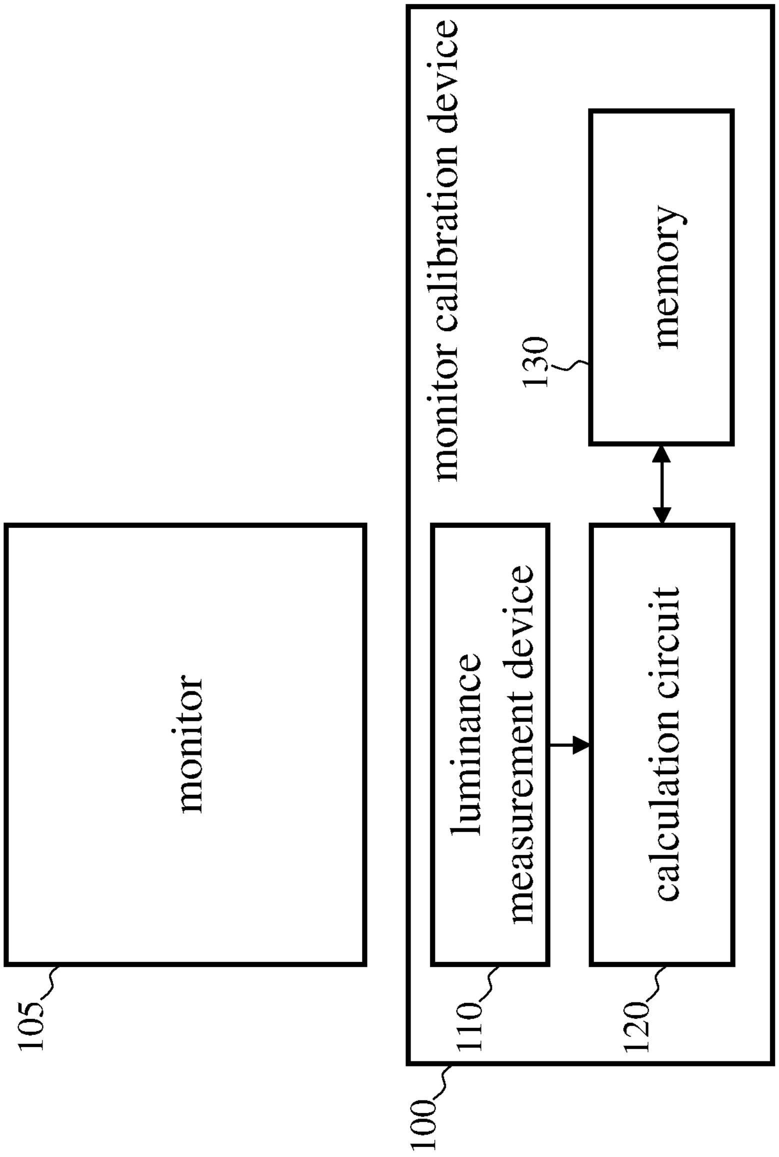
FIG. 1 illustrates a functional block diagram of a monitor calibration device according to an embodiment of the present invention.

The following description is written by referring to terms of this technical field. If any term is defined in this specification, such term should be interpreted accordingly. In addition, the connection between objects or events in the below-described embodiments can be direct or indirect provided that these embodiments are practicable under such connection. Said "indirect" means that an intermediate object or a physical space exists between the objects, or an intermediate event or a time interval exists between the events.

The disclosure herein includes a monitor calibration device, a monitor calibration method, a monitor control circuit, and a monitor control method. On account of that some or all elements of the calibration device and the control circuit could be known, the detail of such elements is omitted provided that such detail has little to do with the features of this disclosure, and that this omission nowhere dissatisfies the specification and enablement requirements. Some or all of the processes of the calibration method and the control method may be implemented by software and/or firmware, and can be performed by the calibration device, the control circuit or their equivalents. A person having ordinary skill in the art can choose components or steps equivalent to those described in this specification to carry out the present invention, which means that the scope of this invention is not limited to the embodiments in the specification.

Given the difficulty in observing grayscale medical images, the monitor must be subjected to a certain brightness curve calibration in order for the users to identify the symptoms from the medical images more easily. This brightness curve calibration generally adopts the grayscale standard display function (GSDF) defined by the digital imaging and communications in medicine (DICOM) as the method or standard of calibrating the brightness curve. The goal of the DICOM to define the brightness curve is that the corresponding brightness difference between any two adjacent brightness codes of the monitor can be perceived by the human eyes and that the same difference in the monitor brightness codes gives the same sensation to the human eyes. The luminance corresponding to each just-noticeable difference (JND) is defined in the documents of the DICOM, and the conversion between the JND and the luminance follows equations (1) and (2) below.

$$\log_{10}L(j) = \frac{a + c\cdot\text{Ln}(j) + e\cdot(\text{Ln}(j))^2 + g\cdot(\text{Ln}(j))^3 + m\cdot(\text{Ln}(j))^4}{1 + b\cdot\text{Ln}(j) + d\cdot(\text{Ln}(j))^2 + f\cdot(\text{Ln}(j))^3 + h\cdot(\text{Ln}(j))^4 + k\cdot(\text{Ln}(j))^5} \quad (1)$$

$$J(L) = A + B\cdot\log_{10}(L) + C\cdot(\log_{10}(L))^2 + D\cdot(\log_{10}(L))^3 + E\cdot(\log_{10}(L))^4 + F\cdot(\log_{10}(L))^5 + G\cdot(\log_{10}(L))^6 + H\cdot(\log_{10}(L))^7 + I\cdot(\log_{10}(L))^8 \quad (2)$$

where L stands for luminance (nits), j stands for the JND, Ln( )stands for the natural logarithm operation, a=−1.3011877, b=−2.5840191E-2, c=8.0242636E-2, d=−1.0320229E-1, e=1.3646699E-1, f=2.8745620E-2, g=−2.5468404E-2, h=−3.1978977E-3, k=1.2992634E-4, m=1.3635334E-3.

During calibration, the brightness curve of the monitor is calibrated according to the first and second luminance of the monitor and the intensity of the ambient light (e.g., illuminance), as shown in equations (3) to (7) below.

$$L'_{min} = L_{min} + R_d \times L_{amb} \quad (3)$$

-continued $$L'_{max} = L_{max} + R_d \times L_{amb} \quad (4)$$

$$J_{min} = J(L'_{min}) \quad (5)$$

$$J_{max} = J(L'_{max}) \quad (6)$$

$$J_i = J_{min} + \frac{P_i(J_{max} - J_{min})}{\Delta P} \quad (7)$$

wherein $L_{min}$ stands for the first luminance (nits), $L_{max}$ stands for the second luminance (nits), $R_d$ stands for the reflectance (nits/lux) of the monitor, and $L_{amb}$ stands for the ambient light intensity (lux), $P_i$ stands for the brightness code of the brightness of the monitor, and ΔP stands for the difference between the maximum code and the minimum code. For example, if the monitor is an 8-bit monitor, then $0 \le P_i \le 255$ and ΔP=255; if the monitor is a 10-bit monitor, then $0 \le P_i \le 1023$ and ΔP=1023. In some embodiments, the first luminance $L_{min}$ may be 95% or more of the maximum luminance of the monitor, and the second luminance $L_{max}$ may be 5% or less of the minimum luminance of the monitor. These numbers are intended to illustrate the invention by way of examples, rather than to limit the scope of the claimed invention.

It can be seen from equations (3) to (7) that during calibration the first luminance $L_{min}$ and the second luminance $L_{max}$ of the monitor are obtained first, and the influence of the ambient light source on the monitor (e.g., the product of the reflectance $R_d$ and the ambient light intensity $L_{amb}$, namely, $R_d \times L_{amb}$) is used as a factor to calculate the third brightness $L'_{max}$ and the fourth brightness $L'_{max}$ (i.e., equations (3) and (4)). Then, by using equation (2) or a look-up table, the third brightness $L'_{max}$ is converted to the first JND $J_{min}$ (i.e., equation (5)), and the fourth brightness $L'_{max}$ to the second JND $J_{max}$ (i.e., equation (6)). After the first JND $J_{min}$ and the second JND $J_{max}$ are obtained, the JND corresponding to each brightness code of the monitor can be calculated (i.e., equation (7)). Then, the JND is converted back to the luminance (i.e., equation (1)). As a result, the luminance of the monitor corresponding to each brightness code can be obtained, which is the process of calibrating the brightness curve.

The two documents TG-18 and TG-270 of the American Association of Physicists in Medicine (AAPM) and the document 62563-1 of the International Electrotechnical Commission (IEC) define the specifications of the diagnostic monitors and use the ratio of the brightness difference to the brightness (dL/L) of each JND error as the main reference value, as in equations (8) to (10).

$$\delta_i = \frac{2(L'_i - L'_{i-1})}{(L'_i + L'_{i-1})(J_i - J_{i-1})} @ 0.5(J_i - J_{i-1}) \quad (8)$$

$$\delta_i^d = \frac{2(L'_i - L'_{i-1})}{(L'_i + L'_{i-1})(J_i - J_{i-1})} @ 0.5(J_i - J_{i-1}) \quad (9)$$

$$k_\delta = \text{Max}\left(\frac{|\delta_i - \delta_i^d|}{\delta_i^d}\right) \quad (10)$$

$\delta_i$ is the measured value of "the ratio of the brightness difference to the brightness of each JND" corresponding to $0.5(J_i - J_{i-1})$, $\delta_i^d$ is the theoretical value of "the ratio of the brightness difference to the brightness of each JND" corresponding to $0.5(J_i - J_{i-1})$ and $k_\delta$ is "the ratio of the brightness difference to the brightness of each JND error."

In general, the calculation of $k_\delta$ merely measures the luminance under a specific brightness code only. Taking the TG-18 as an example, if the monitor is an 8-bit monitor (i.e., the brightness code is between 0 and 255), the luminance is measured for every 15 brightness codes (i.e., the luminance values for a total of 18 brightness codes are measured), and the measured luminance values are used to calculate $\delta_i$ (equation (8)), which is then compared with $\delta_i^d$ (equation (9)) to obtain $k_\delta$ (equation (10)).

It can be seen from equations (3) to (7) that the brightness curve of the monitor is influenced by the ambient light source (e.g., the change in the ambient light intensity $L_{amb}$). If the current brightness curve is not changed according to the ambient light source, "the ratio of the brightness difference to the brightness of each JND error" will probably exceed the standard value. Therefore, the brightness curve should be calibrated according to the change in the ambient light source.

Figure 2:
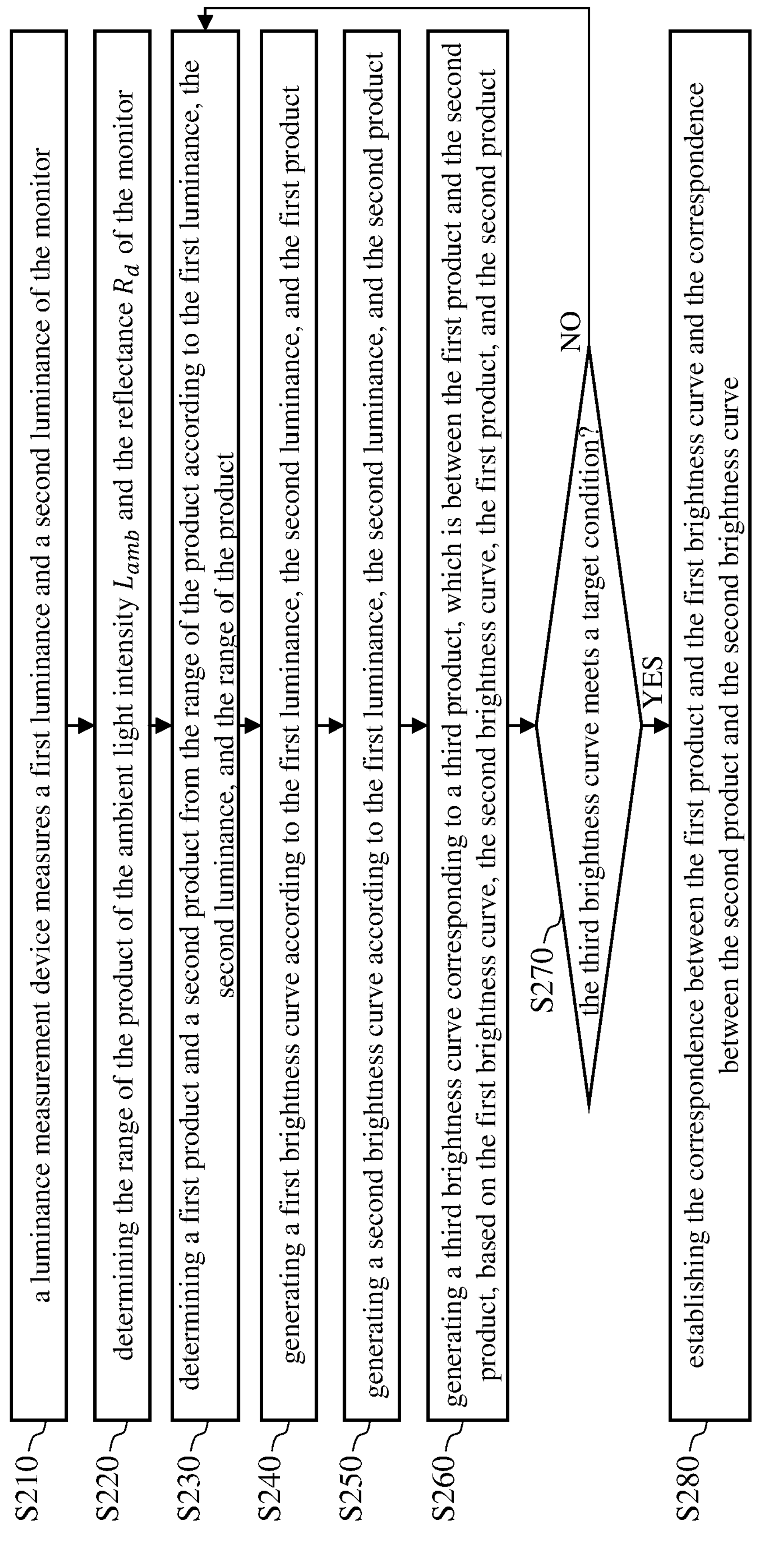
FIG. 2 illustrates a flowchart of a monitor calibration method according to an embodiment of the present invention.

FIG. 1 is a functional block diagram of a monitor calibration device according to an embodiment of the present invention, and FIG. 2 is a flowchart of a monitor calibration method according to an embodiment of the present invention. The monitor calibration device 100 includes a luminance measurement device 110, a calculation circuit 120, and a memory 130. The monitor calibration method includes the following steps.

Step S210: The luminance measurement device 110 measures a first luminance $L_{min}$ and a second luminance $L_{max}$ of the monitor 105. The luminance measurement device 110 can be embodied by a conventional luminance measurement device.

Step S220: The calculation circuit 120 determines the range of the product of the ambient light intensity $L_{amb}$ and the reflectance $R_d$ of the monitor 105 (i.e., to determine the range of $L_{amb}\times R_d$). For example, after the possible range of the reflectance $R_d$ (e.g., $0.01>R_d>0.001$) and the possible range of ambient light intensity $L_{amb}$ (e.g., $100>L_{amb}>0.5$) are obtained, the calculation circuit 120 can calculate the possible range of $R_d\times L_{amb}$ (e.g., $1>R_d\times L_{amb}>0.0005$). In some embodiments, the possible range of the reflectance $R_d$ is obtained from the specifications of the monitor 105 or estimated according to the surface material of the monitor 105, while the possible range of the ambient light intensity $L_{amb}$ is estimated according to the potential environment in which the monitor 105 is being used.

Step S230: The calculation circuit 120 determines a first product $A_0$ and a second product $A_1$ from the range of $L_{amb}\times R_d$ according to the first luminance $L_{min}$, the second luminance $L_{max}$, and the range of $L_{amb}\times R_d$. That is to say, the first product $A_0$ and the second product $A_1$ are between the greatest value of $L_{amb}\times R_d$ and the smallest value of $L_{amb}\times R_d$.

Step S240: The calculation circuit 120 generates a first brightness curve $G_0$ corresponding to the first product $A_0$ according to the first luminance the second luminance $L_{max}$, and the first product $A_0$. More specifically, in this step, the calculation circuit 120 obtains the first brightness curve $G_0$ based on equations (1) to (7).

Step S250: The calculation circuit 120 generates a second brightness curve $G_1$ corresponding to the second product $A_1$ according to the first luminance $L_{min}$, the second luminance $L_{max}$, and the second product $A_1$. More specifically, in this step, the calculation circuit 120 obtains the second brightness curve $G_1$ based on equations (1) to (7).

Step S260: Based on the first brightness curve $G_0$, the second brightness curve $G_1$, the first product $A_0$, and the second product $A_1$, the calculation circuit 120 generates a third brightness curve $G_0$ corresponding to a third product $\alpha_0$, which is between the first product $A_0$ and the second product $A_1$. In some embodiments, the calculation circuit 120 uses interpolation to obtain the third brightness curve $G_0$.

Step S270: The calculation circuit 120 determines whether the third brightness curve $G_0$ meets a target condition. In some embodiments, the target condition may include the condition(s) set or established in the TG-18, TG-270 and/or IEC 62563-1 document(s) for $k_\delta$ (i.e., "the ratio of the brightness difference to the brightness of each JND error"). For example, the target condition can be that $k_\delta$ is less than or equal to a threshold value (e.g., $k_\delta\leq 10\%$). If the third brightness curve $G_0$ meets the target condition, the calculation circuit 120 performs step S280; if the third brightness curve $G_0$ does not meet the target condition, the calculation circuit 120 performs step S230. The result of step S270 being negative means that the first product $A_0$ and/or the second product $A_1$ is (are) not ideal, so the calculation circuit 120 performs step S230 again to determine the first product (which is different from the first product $A_0$) and/or the second product $A'_1$(which is different from the second product $A_1$).

Step S280: The calculation circuit 120 establishes the correspondence between the first product $A_0$ and the first brightness curve $G_0$ and the correspondence between the second product $A_l$ and the second brightness curve $G_1$. In some embodiments, the calculation circuit 120 creates a look-up table in the memory 130 to record the correspondences between the products and the brightness curves.

In other embodiments, the calculation circuit 120 may determine more than three products ($A_0$ to $A_n$, n being an integer greater than or equal to two) (an extension of step S230), generate multiple brightness curves ($G_0$ to $G_n$) corresponding the products ($A_0$ to $A_n$) (extension of steps S240 and S250), generate by interpolation multiple brightness curves ($g_0$ to $g_m$, m being an integer greater than or equal to one) based on two adjacent products ($A_k$ and $A_{k+1}$, $0\leq k\leq n-1$) (extension of step S260), determine whether the brightness curves ($g_0$ to $g_m$) generated by interpolation meet the target condition (extension of step S270), and establish the correspondences between the products ($A_0$ to $A_n$) and the brightness curves ($G_0$ to $G_n$) when the brightness curves ($g_0$ to $g_m$) generated by interpolation meet the target condition (extension of step S280).

After the process of FIG. 2 finishes, multiple brightness curves ($G_0$ to $G_n$) and their corresponding products ($A_0$ to $A_n$) of the reflectance $R_d$ and the ambient light intensity $L_{amb}$ can be obtained. These data can be used for controlling, calibrating, or setting the monitor.

Figure 3:
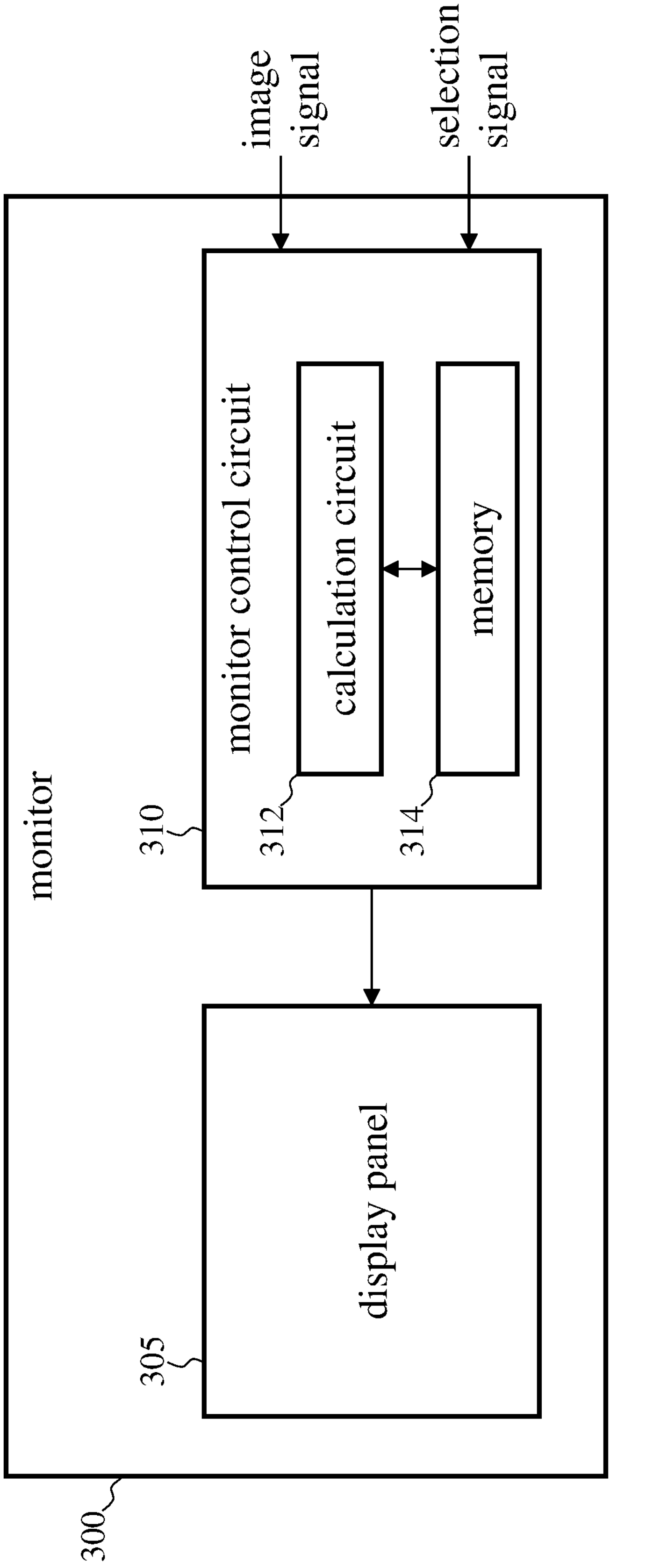
FIG. 3 illustrates a functional block diagram of a monitor control circuit according to an embodiment of the present invention.
Figure 4:
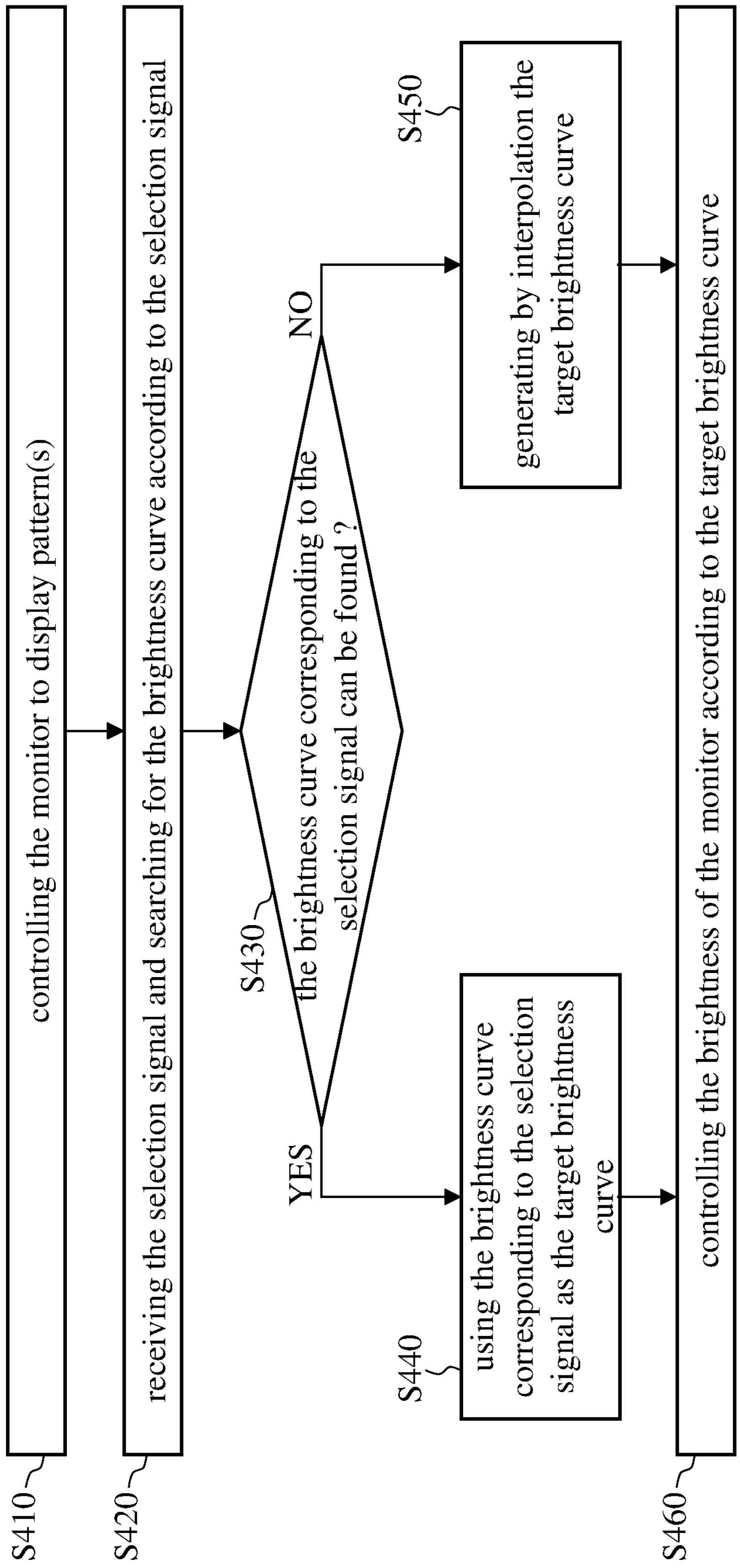
FIG. 4 illustrates a flowchart of a monitor control method according to an embodiment of the present invention.

FIG. 3 is a functional block diagram of a monitor control circuit according to an embodiment of the present invention, and FIG. 4 is a flowchart of a monitor control method according to an embodiment of the present invention. The monitor 300 includes a display panel 305 and a monitor control circuit 310. The monitor control circuit 310 includes a calculation circuit 312 and a memory 314. The monitor 300 may be a general monitor or a diagnostic monitor. The monitor control circuit 310 is used to control the display panel 305 to display images. For example, the monitor control circuit 310 is the scaler of the monitor 300. In addition to controlling the on-screen display (OSD) of the monitor 300, the monitor control circuit 310 can also process the image signals inputted to the monitor 300 (including but not limited to scaling, deinterlacing, color adjustment, brightness (grayscale) adjustment) and then control the display panel 305 to display the processed image. The memory 314 may include a non-volatile memory (e.g., a flash memory) and a volatile memory (e.g., a dynamic random-access memory). The image signals may be generated by a computer or medical device coupled to the monitor 300. The memory 314 stores a plurality of program codes or program instructions, and the calculation circuit 312 executes the program codes or program instructions to carry out the function(s) of the monitor control circuit 310. In some embodiments, the memory 314 further stores the first luminance $L_{min}$, the second luminance $L_{max}$, a plurality of brightness curves ($G_0$ to $G_n$), and one or more of the products ($A_0$ to $A_n$) of the reflectance $R_d$ and the ambient light intensity $L_{amb}$, which products correspond to the brightness curves ($G_0$ to $G_n$). As shown in FIG. 4, the monitor control method includes the following steps.

Step S410: The monitor control circuit 310 controls the monitor 300 to display pattern(s). The pattern(s) can be the "Quality Control" grayscale pattern (e.g., the "TG18-QC") established in the TG-18 document for the user to determine whether the details displayed on the display panel 305 can be clearly identified. In some embodiments, the pattern(s) is(are) stored in the memory 314, and the calculation circuit 312 displays the pattern(s) via the OSD. In other embodiments, the pattern(s) is(are) inputted to the monitor 300 through the image signals.

Step S420: The monitor control circuit 310 receives the selection signal, and searches for the brightness curve according to the selection signal. The selection signal corresponds to the product of the reflectance $R_d$ and the ambient light intensity $L_{amb}$. The selection signal may be triggered through the screen (e.g., the display panel 305 is a touch panel) or a button on the monitor 300 or generated by a device coupled to the monitor 300 (i.e., the user operates the device to generate the selection signal). The calculation circuit 312 searches the memory 314 for the corresponding brightness curve according to the selection signal.

Step S430: The calculation circuit 312 determines whether the brightness curve corresponding to the selection signal can be found in the memory 314. If the result of step S430 is YES, the monitor control circuit 310 performs step S440; if not, the monitor control circuit 310 performs step S450.

Step S440: The calculation circuit 312 uses the brightness curve corresponding to the selection signal as the target brightness curve. More specifically, in step S420, the monitor control circuit 310 has found the brightness curve (e.g., $G_k$) corresponding to the selection signal (e.g., $A_k$) in the memory 314; therefore, the monitor control circuit 310 uses the found brightness curve (e.g., $G_k$) as the target brightness curve.

Step S450: The calculation circuit 312 generates by interpolation the target brightness curve. More specifically, when the memory 314 does not store the brightness curve corresponding to the selection signal (e.g., $a_k$, $A_k<a_k<A_{k+1}$), the calculation circuit 312 generates the target brightness curve by performing interpolation calculation according to multiple brightness curves (e.g., $G_k$ and $G_{k+1}$) and their corresponding the products ($A_k$ and $A_{k+1}$) stored in the memory 314 and the selection signal. However, it should be understood that interpolation is just one of the practical implementations, and the present invention is not limited thereto.

Step S460: The monitor control circuit 310 controls the brightness of the monitor 300 according to the target brightness curve. More specifically, the monitor control circuit 310 displays the image signals on the display panel 305 according to the target brightness. In other words, the brightness of each pixel of the display panel 305 can be controlled by the monitor control circuit 310 according to the target brightness curve.

In view of the foregoing, because the calibration device, control circuit, and their corresponding methods take the ambient light intensity and reflectance of the monitor into account at the same time (i.e., the ambient light intensity and reflectance are treated as a single parameter (i.e., the product discussed above)), the user can adjust the monitor to meet the current use condition (e.g., to clearly identify the details on the grayscale pattern of "Quality Control") by merely adjusting one parameter (i.e., adjusting through the selection signal or selecting the product), which avoids complex or time-consuming calibration procedures. In addition, the present invention can support continuous adjustment (i.e., the values of the selection signal are continuous) by using interpolation and verifying whether the brightness curve(s) obtained by interpolation meet(s) the target condition, and the selected target brightness curve can meet the requirements set by the calibration. Furthermore, because the ambient light intensity has been taken into account in the generation of multiple brightness curves ($G_0$ to $G_n$) (i.e., the process of FIG. 2), devices (e.g., an illuminometer) other than the monitor are not needed when the user is performing the process of FIG. 4. Therefore, compared with the prior art, the present invention provides a calibration device, a control circuit, and their corresponding methods that are simple to operate and time-saving.

The calculation circuit 120 and the calculation circuit 312 may be circuits or electronic components with program execution capabilities, such as a central processing unit, microprocessor, microcontroller, micro processing unit, or equivalent thereof. The calculation circuit 120 and the calculation circuit 312 execute the program codes or program instructions stored in the memory 130 and the memory 314, respectively, to perform the processes of FIG. 2 and FIG. 4, respectively. In other embodiments, people having ordinary skill in the art can design the calculation circuit 120 and the calculation circuit 312 according to the above discussions. That is, the calculation circuit 120 and the calculation circuit 312 can be an application specific integrated circuit (ASIC) or embodied by circuits or hardware such as a programmable logic device (PLD).

Since a person having ordinary skill in the art can appreciate the implementation detail and the modification thereto of the present method invention through the disclosure of the device invention, repeated and redundant description is thus omitted. Please note that the shape, size, and ratio of any element in the disclosed figures are exemplary for understanding, not for limiting the scope of this invention. Furthermore, there is no step sequence limitation for the method inventions as long as the execution of each step is applicable. In some instances, the steps can be performed simultaneously or partially simultaneously.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A monitor calibration device, comprising:

a luminance measurement device configured to measure a first luminance and a second luminance of a monitor;

a memory configured to store a plurality of program codes or program instructions; and a calculation circuit coupled to the luminance measurement device and the memory and configured to execute the program codes or program instructions to perform following steps:

(A) determining a range of a product of a reflectance of the monitor and an ambient light intensity;

(B) determining a first product and a second product from the range of the product according to the range of the product, the first luminance, and the second luminance;

(C) generating a first brightness curve according to the first luminance, the second luminance, and the first product;

(D) generating a second brightness curve according to the first luminance, the second luminance, and the second product;

(E) generating a third brightness curve corresponding to a third product according to the first brightness curve, the second brightness curve, the first product, and the second product, the third product being between the first product and the second product; and (F) determining whether the third brightness curve meets a target condition;

wherein when the third brightness curve meets the target condition, the first brightness curve and the second brightness curve are used to calibrate the monitor.

2. The monitor calibration device of claim 1, wherein when the third brightness curve does not meet the target condition, the calculation circuit performs steps (B) to (F) again.

3. The monitor calibration device of claim 1, wherein when the third brightness curve meets the target condition, the calculation circuit further performs following steps:

(G) establishing a correspondence between the first product and the first brightness curve and establishing a correspondence between the second product and the second brightness curve.

4. The monitor calibration device of claim 1, wherein the target condition is that a ratio of a brightness difference to a brightness of each just-noticeable difference (JND) error is less than or equal to a threshold value.

* * * * *